(12) United States Patent
Mugitani et al.

(10) Patent No.: US 7,032,080 B2
(45) Date of Patent: Apr. 18, 2006

(54) PLURAL STATION MEMORY DATA SHARING SYSTEM

(75) Inventors: Tomihiro Mugitani, Iruma (JP); Toshiki Natsui, Tokyo (JP)

(73) Assignees: Step Technica Co., Ltd., Saitama (JP); Koyo Electronics Industries Co. Ltd., Tokyo (JP)

( * ) Notice: Subject to any disclaimer, the term of this patent is extended or adjusted under 35 U.S.C. 154(b) by 263 days.

(21) Appl. No.: 10/129,173

(22) PCT Filed: Aug. 30, 2001

(86) PCT No.: PCT/JP01/07483

§ 371 (c)(1),
(2), (4) Date: May 8, 2003

(87) PCT Pub. No.: WO02/21775

PCT Pub. Date: Mar. 14, 2002

(65) Prior Publication Data

US 2003/0172233 A1    Sep. 11, 2003

(30) Foreign Application Priority Data

Sep. 1, 2000    (JP)    ............................. 2000-265396

(51) Int. Cl.
*G06F 12/00*    (2006.01)
*H04L 12/40*    (2006.01)

(52) U.S. Cl. ...................... 711/148; 711/122; 370/438; 370/535

(58) Field of Classification Search ................ 711/119, 711/122, 148; 370/535, 438
See application file for complete search history.

(56) References Cited

U.S. PATENT DOCUMENTS

| | | | | |
|---|---|---|---|---|
| 4,754,451 A | * | 6/1988 | Eng et al. .................... | 370/417 |
| 5,428,645 A | * | 6/1995 | Dolev et al. ................ | 375/354 |
| 5,485,457 A | * | 1/1996 | Aramaki ..................... | 370/238 |
| 5,594,738 A | * | 1/1997 | Crisler et al. ............... | 370/347 |
| 5,666,358 A | * | 9/1997 | Paratore et al. ............. | 370/347 |
| 5,710,765 A | * | 1/1998 | Lee et al. ..................... | 418/36 |
| 5,847,659 A | * | 12/1998 | Mugitani ............... | 340/825.29 |
| 5,945,944 A | * | 8/1999 | Krasner ................ | 342/357.06 |

* cited by examiner

*Primary Examiner*—Pierre Bataille
*Assistant Examiner*—Sheng-Jen Tsai
(74) *Attorney, Agent, or Firm*—Michael A. Glenn; Glenn Patent Group

(57) ABSTRACT

A plural station memory data sharing system in which packets are sent/received between plural stations interconnected through communication lines. Each station has a unique station address value, and the time is made to correspond to each station address value. The internal clock (39) in each station indicates the same time and circulates from time $T_{00}$ to an upper limit time TM. When the internal clock (39) indicates a time corresponding to the station address value of a station, data stored in a memory at the address position corresponding to the station address value is buried in a packet and the packet is sent through a communication line. An allowance time error sensing circuit (34) compares the calculated correct time of the internal clock of the station and the time indicated by the internal clock, If the error is out of an allowance range, the internal clock (39) is forcedly calibrated to the correct time.

7 Claims, 13 Drawing Sheets

PLURAL STATION MEMORY DATA SHARING SYSTEM

TECHNICAL FIELD

This invention relates to a system for sharing memory data of a plurality of stations in which all the stations can share the same memory data.

BACKGROUND ART

One of the joint applicants of the present application, STEP TECHINICA Co. Ltd., filed a patent application relating to "an electronic wired system based on automatic cyclical communication" which has been granted as a patent under No. 2,994,589. This patent will be described with reference to FIG. 1. This electronic wired system is constituted by N sets of terminal devices 2, a central unit 1 for controlling the terminal devices 2 and a common communication line 3 connecting these together. Data at an input port 21 and an output port 22 of each terminal device 2 is circulated through the terminal devices in the form of packets and stored in a memory 4 of the central unit 1 at a respective one of memory locations having addresses which correspond to the terminal devices, respectively. In this electronic wired system, since transmission and reception of data is performed by means only of hardware called "a state machine", the speed of transmission and reception of data has been significantly increased as compared to that according to the conventional communication based on a programmed control with a microprocessor. Furthermore, since data at the input port 21 and the output port 22 of each terminal device is stored in the memory, the central unit 1 can read/write data at the output/input port of any terminal device substantially in real time.

In the case of this electronic wired system, however, there is a problem that a given terminal device cannot read data from the input/output port of another terminal device or write data into such port, although the central unit 1 can read/write data at the output/input port of any terminal device as described above. The feature that a given terminal device can read data from and/or write data into another terminal device is needed in the case where a system must operate as a whole with its terminal devices acting one upon the other, such as in the case of a man-like robot or the like where a terminal device is provide for each joint.

Furthermore, there is another problem in the above-described electronic wired system that when the central unit 1 fails the entire system stops functioning since no transmission and reception of packets is performed.

DISCLOSURE OF INVENTION

It is therefore an object of the present invention to provide a system for sharing memory data which obviates the above-mentioned problems of the conventional electronic wired system, enables its stations to communicate data to each other and keeps the entire system functioning even when a station thereof stops functioning by causing the remaining stations to continue to function.

In order to achieve the above object, a memory data sharing system according to the invention is a system for sharing memory data of a plurality of stations by transferring packets between the plurality of stations connected to a communication line, which system is characterized:

in that each station is a memory-type station device which comprises a memory, a user interface for enabling the memory to be accessed from the exterior of the station, a transmission state machine for transmitting a packet, a reception state machine for receiving a packet, an internal clock, an allowable time-error determination circuit, and an arbitration circuit for arbitrating accesses from the transmission and reception state machines and from the user interface;

in that specific station address values 00, 01, . . . , 0N are set to the stations, respectively;

in that a sum of a time required to send a packet onto the communication line and a time required for the packet to propagate on the communication line is selected to be a unit of time between time instants indicated by the internal clock;

in that each time instant ($T_{00}$, $T_{01}$, $T_{02}$, . . . , $T_{0N}$) is assigned to a respective one of the station address values;

in that the internal clocks of the stations in the system all indicate the same time instant and each advances from the time instant $T_{00}$ to a maximum time instant $T_M$ cyclically;

in that, when the internal clock indicates a time instant which corresponds to the station address value of a given station, data in that memory address location of the memory which corresponds to the station address value of the given station is read through the arbitration circuit and embedded in a packet which is then transmitted over the communication line;

in that, when a packet is received successfully, its transmission source is determined from the received packet, whereupon the data in the received packet is written through the arbitration circuit into that memory address location which corresponds to the station address value of transmission source; and in that the allowable time-error determination circuit compares a correct time instant of the internal clock of the own station as calculated from the unit of time with a time instant as indicated by the internal clock and, if a difference between these time instants exceeds an allowable value, forces the time instant of the internal clock to be corrected to agree to the correct time instant.

According to this system, the specific station addresses 00, 01, . . . , 0N are set to the stations, respectively, and all the internal clocks in the stations indicate the same time instant, i.e., one of T00, T01, . . . , T0N which correspond to the specific station address values 00, 01, . . . , 0N, respectively. The sum of the time required to send a packet onto the communication line and the time required for the packet to propagate on the communication line is selected to be a unit of time for the internal clock. That is to say, the internal clock advances its time instant to the next time instant each time this one unit of time has lapsed. When the time instant indicated by the internal clock reaches the maximum time instant $T_M$, it then returns to a time instant corresponding to 00, whereby the internal clock advances from the time instant $T_{00}$ to the time instant $T_M$ cyclically. When the internal clock indicates a time instant which corresponds to the station address value of a given station, data in that memory address location of the memory which corresponds to the station address value of that station is read through the arbitration circuit, which data is embedded in a packet and is then transmitted over the communication line. When a packet is received successfully, its transmission source is recognized from the received packet, and the data in the received packet is written through the arbitration circuit into that memory address location which corresponds to the station address value of the transmission source. When this process makes a round over the time instants T00 to TM, the memory data contained in those memory address locations in the memories of all the stations which correspond to each specific station address value become identical. This is to say, from that moment, all the memories of the stations share the same memory content.

The allowable time-error determination circuit compares a correct time instant of the internal clock of the own station as calculated from the unit of time with a time instant as indicated by the internal clock and, if a difference between these time instants exceeds an allowable value, forces the time instant of the internal clock to be corrected to agree to the correct time instant. Thus, it is ensured that all the stations keep the same time instant within a range of the allowable value.

By employing the above structure, in the system for sharing memory data of a plurality of stations, even if a station fails, the other stations can continue to transmit and receive packets autonomously, so that the system can continue to function.

Another system for sharing memory data of a plurality of stations according to the invention is characterized:

in that an I/O-type station device comprising an I/O terminal output port, an I/O terminal input port, an output address setting circuit, an output-port data holding circuit, a transmission state machine for transmitting a packet, a reception state machine for receiving a packet, an internal clock and an allowable time-error determination circuit is additionally connected to the communication line;

in that, when the internal clock indicates a time instant which corresponds to the station address value of a given station composed of the I/O-type station device, data is read from the I/O terminal input port of that station and embedded into a packet which is then transmitted over the communication line; and in that, when a packet is received successfully and when a preset value to the output address setting circuit and the station address value of a transmission source of the received packet agree to each other, the relevant data in the received packet is held in the output-port data holding circuit and supplied to the I/O terminal output port.

In this system, the I/O-type station device comprising the I/O terminal output port, the I/O terminal input port, the output address setting circuit and the output-port data holding circuit has been connected in addition to the memory-type station device which enables the user to read data from and write data to the memory in the station through the user interface such as a microprocessor. In this system, the I/O-type station device can perform reading/writing of memory data in the memory-type station device.

In either of the above-described systems for sharing memory data of a plurality of stations, in which a length of the data in the packet is fixed and in which the memory-type station device comprises a packet transmission number determination circuit for causing packets equal in number to a number set to the packet transmission number determination circuit to be transmitted in succession from a time instant corresponding to the station address value of the own station to thereby allow the memory-type station device to occupy a memory address range which corresponds to a plurality of stations, when the internal clock indicates a time instant corresponding to the station address value of the own station, data is read from a memory address location corresponding to the station address value of the own station and embedded in a packet which is then transmitted. When the internal clock indicates the next time instant, data is read from a memory address location corresponding to the next one of the station address value of the own station and embedded in a packet which is then transmitted. In this manner, packets equal in number to the number set to the packet transmission number determination circuit are transmitted, so that the amount of data which is written into other stations within one cycle of the internal clock can be increased by a factor equal to the number set to the packet transmission number determination circuit.

In either of the above-described systems for sharing memory data of a plurality of stations, in which a length of the data in the packet is variable while information of the data length is added to the packet and in which the memory-type station device comprises a station address occupation size determination circuit which causes a packet having a data length set to the station address occupation size determination circuit to be transmitted from a time instant corresponding to the station address value of the own station to thereby allow the memory-type station device to occupy a memory address range which corresponds to a plurality of stations, when the internal clock indicates a time instant corresponding to the station address value of the own station, data in the range from a start memory address corresponding to the station address value of the own station to a memory address corresponding to the station address value to which the value set to the station address occupation size determination circuit has been added is read at once and embedded in a packet which is then transmitted. Thus, it becomes possible to write data, whose size is increased by a factor equal to the value set to the station address occupation size determination circuit, in the other stations at once within one cycle of the internal clock.

In any one of the above-described systems for sharing memory data of a plurality of stations, in which reception completion information from other stations is added to the packet, and in which the memory-type station device is further provided with a reception condition managing register for managing a handshaking condition or a condition of the communication line in each cycle of the internal clock based on the reception completion information, even when the system is installed in an environment where packet transmission may be subjected to an external interference, it is possible to determine the quality in operation of the system in terms of whether such packet transmission has been interfered with. It may also be made possible to determine whether the shared data is that updated in the immediately preceding cycle of the internal clock.

When the memory-type station device or the I/O-type station device for the system for sharing memory data of a plurality of stations is constituted by a semiconductor integrated circuit, it becomes compact and cost-efficient.

BEST MODE FOR CARRYING OUT THE INVENTION

A system for sharing memory data of a plurality of stations will now be described with reference to each of its five embodiments.

First Embodiment

Figure 1:
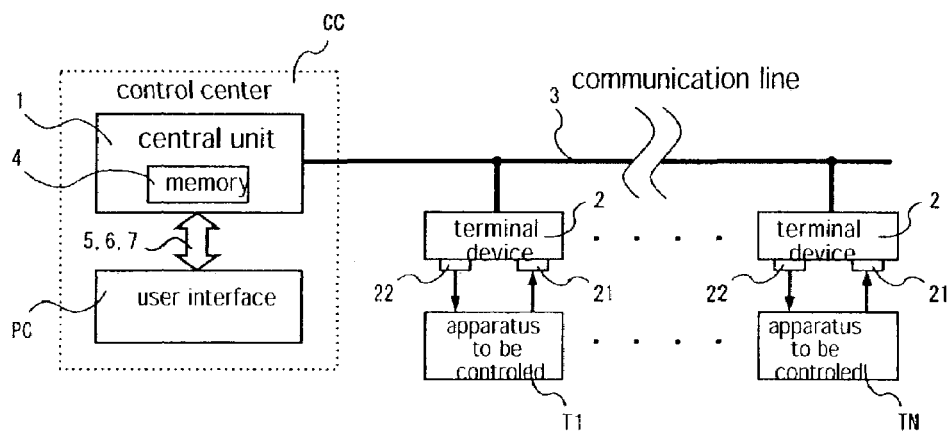
FIG. 1 is an illustration showing the structure of a conventional electronic wired system.
Figure 2:
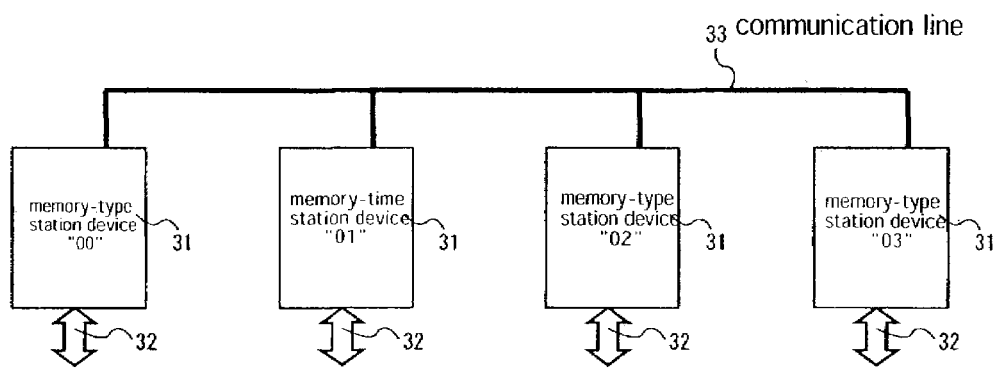
FIG. 2 is an illustration showing the structure of a memory sharing system provided in accordance with a first embodiment of the invention.

A system for sharing memory data of a plurality of stations according to a first embodiment of the invention is a system in which each station is composed only of a memory-type station device 31 (see FIG. 2).

Figure 3:
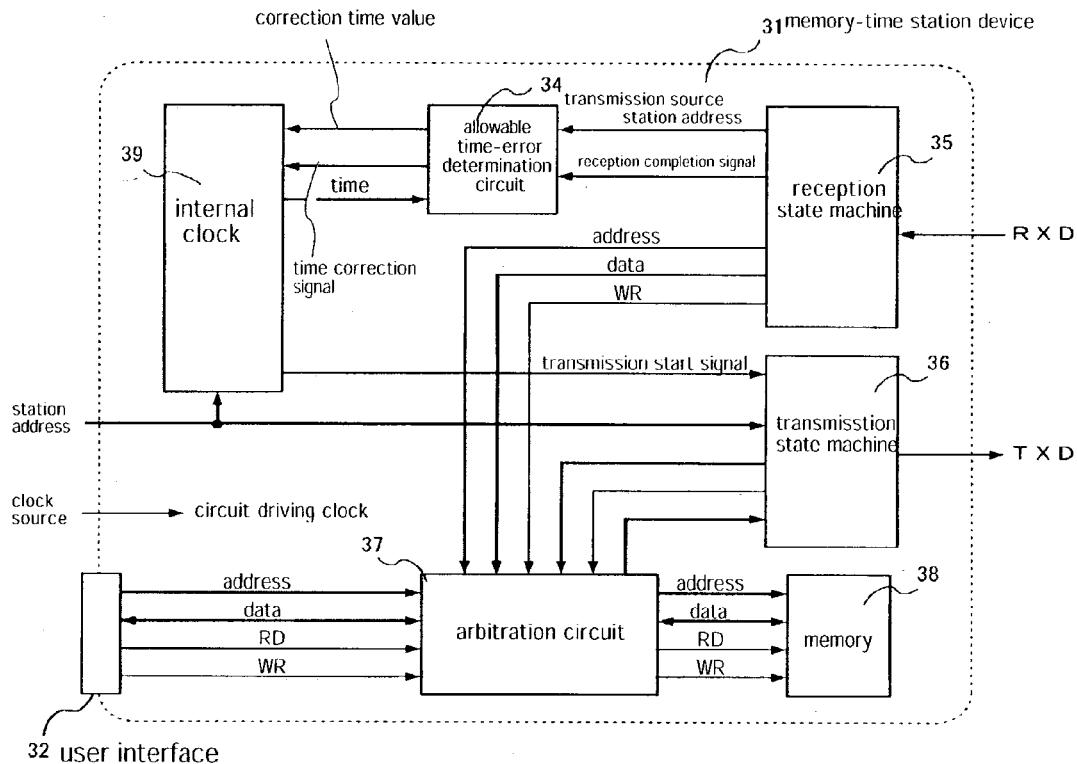
FIG. 3 is an illustration showing the structure of a memory-type station device used in each station of the system according to the first embodiment.

Each memory-type station device 31 is formed by a semiconductor integrated circuit and comprises, as shown in FIG. 3, a user interface 32, an allowable time-error determination circuit 34, a reception state machine 35, a transmission state machine 36, an arbitration circuit 37, a memory 38 and an internal clock 39, all of which are constituted by digital circuits each driven by a circuit-driving clock from a clock source.

The internal clock 39 is constituted by an incrementing counter circuit in which its count value is increased from "0" and returned to "0" upon reaching the upper limit time "$T_M$" defined specifically to this system, whereby its time is advanced cyclically. When the time instant indicated by the internal clock 39 agrees to the time instant corresponding to a station address value of this own station, a command to start transmission is issued to the transmission state machine 36.

The transmission state machine 36 sends a memory address corresponding to the station address value and a read command RD to the arbitration circuit 37 to thereby obtain through the arbitration circuit 37 data to be embedded into a packet from the memory 38, which packet is then transmitted.

When a packet is received from another station, the reception state machine 35 recognizes from the received packet its transmission source and then sends to the arbitration circuit 37 a memory address corresponding to the station address value of that transmission source together with the relevant data in the received packet and a write command WR to thereby complete writing of such information through the arbitration circuit 37 into the memory 38.

In addition, the reception state machine 35 signals the allowable time-error determination circuit 34 of the time instant of the completion of reception by means of the station address value of the transmission source of the received packet and a reception completion signal.

The allowable time-error determination circuit 34 compares the correct time instant of the internal clock of the own station as calculated with the time instant as indicated by the internal clock 39 and, when the difference exceeds an allowable value, forces the time instant of the internal clock 39 to be corrected to agree to the correct time instant.

The memory-type station device 31 comprises a user interface 32 which enables transmission and reception of data between a computer apparatus connected to this memory-type station device 31 and the memory in the own station. This user interface 32 handles address bus data, data bus data, a read control signal RD and a write control signal WR.

The arbitration circuit 37 enables read and write accesses made by the user to the memory 38 in the memory-type station device 31 through the user interface 32 and accesses to the memory 38 by the transmission state machine 36 or the reception state machine 35 to be carried out without any conflict.

Figure 4:
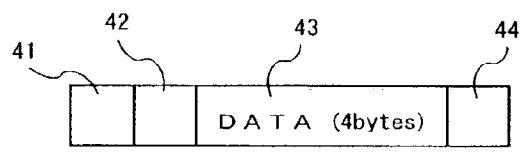
FIG. 4 is an illustration showing a packet used in the system according to the first embodiment.

A packet used in this embodiment is shown in FIG. 4. This packet is formatted to be composed of a start pattern 41, a transmission-source station address value 42, four-byte data 43 and a parity code 44.

Figure 5:
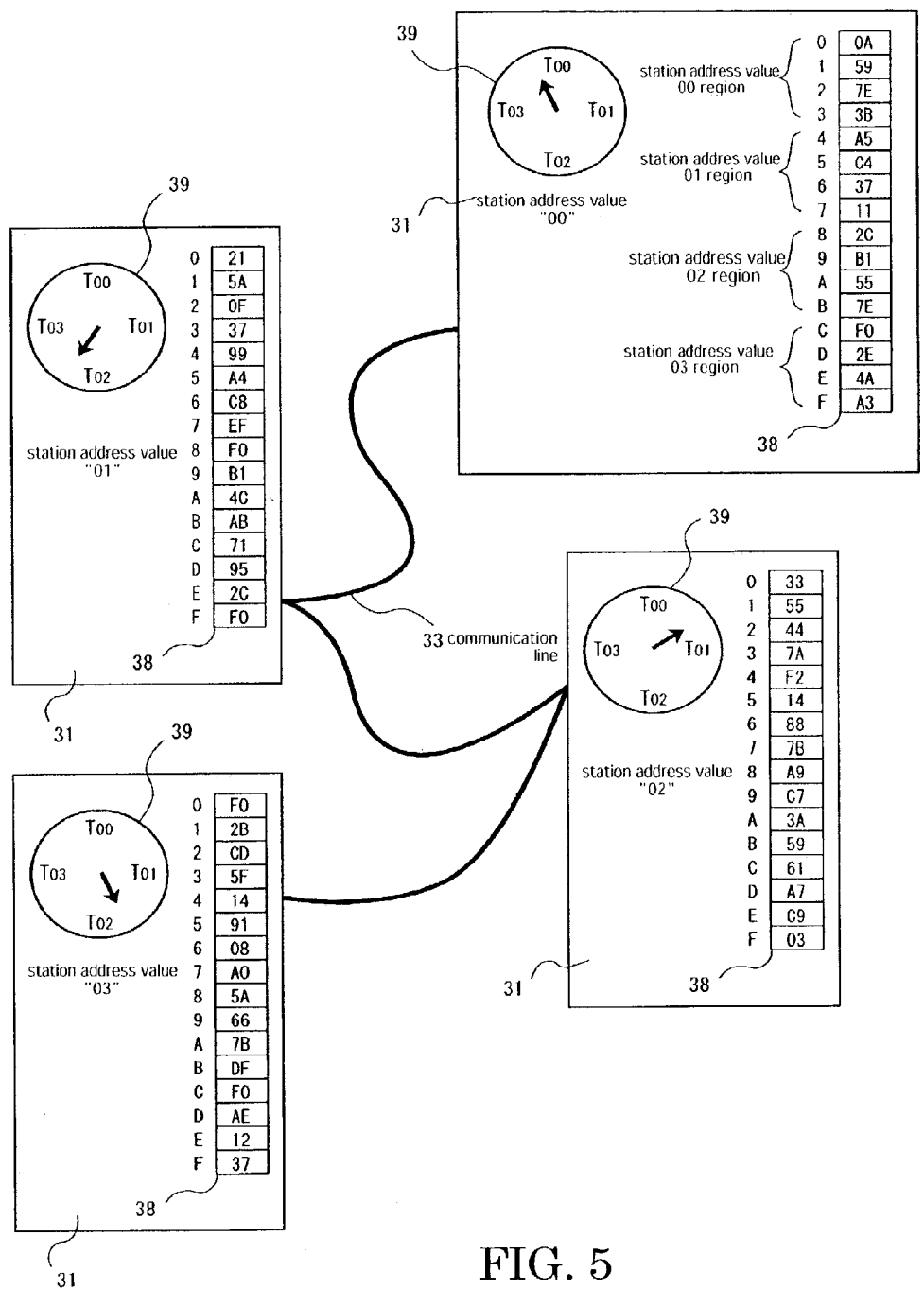
FIGS. 5 to 7 are illustrations explaining the operation of the memory sharing system according to the first embodiment.
Figure 6:
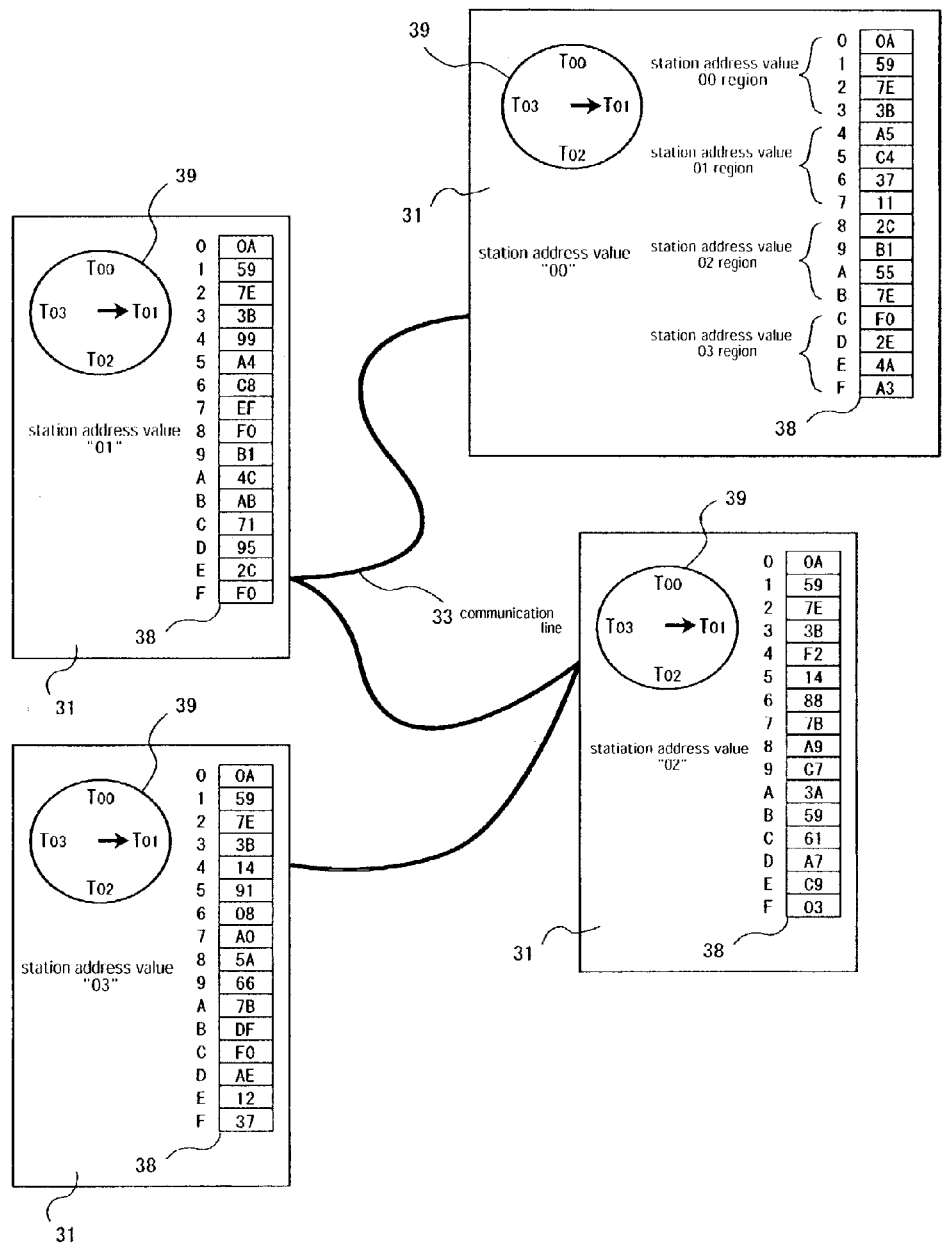
Figure 7:
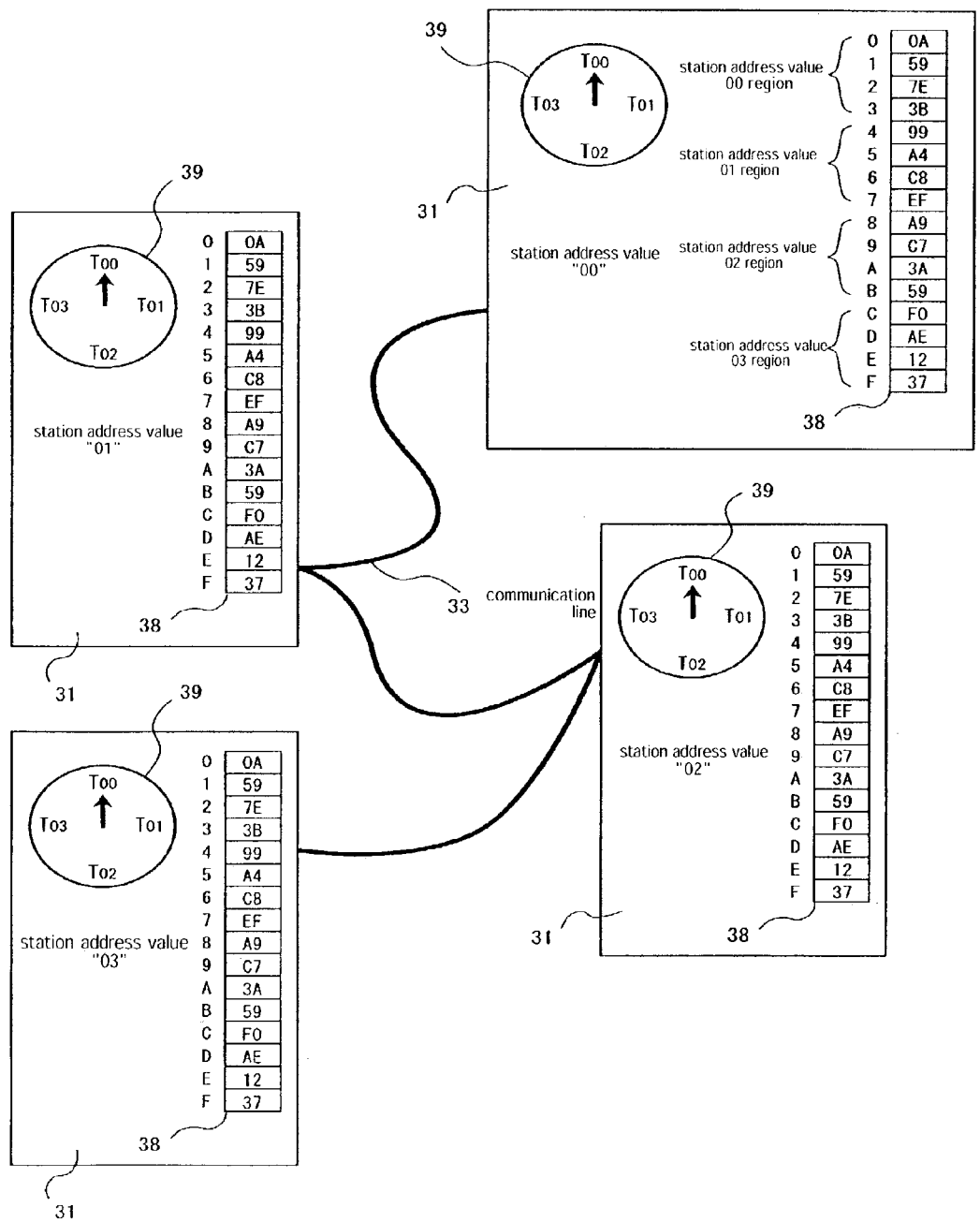

The operation of the first embodiment will now be described for an exemplary system composed of four memory-type stations devices 31 with reference to FIGS. 5 to 7. As shown in FIG. 2, these memory-type station devices 31 are connected to the communication line 33 and given specific station address values 00 to 03, respectively. FIGS. 5 to 7 show data contents of the memories 38 of the respective station devices having station address values 00 to 03 for each time instant indicated by the internal clocks.

The relationship between memory addresses of each memory 38 and the station address values in the system is shown in FIG. 5. The memory address location of the memory corresponding to the station address value 00, which is indicated by "station address value 00 region", is defined by the memory addresses 0 to 3. The memory address location of the memory corresponding to the station address value 01, which is indicated by "station address value 01 region", is defined by the memory addresses 4 to 7. Likewise, the memory address location corresponding to the station address value 02 is defined by the memory addresses 8 to B and the memory address location corresponding to the station address value 03 by the memory addresses C to F. In this manner, the memories of all the memory-type stations devices 31 are given specific memory addresses, and each memory can hold the data of all the memories in the system.

Immediately after the start of the system, the internal clocks of the respective stations indicate different time instants and their memories contain different data, as shown in FIG. 5.

When the internal clock of the memory-type station device having station address value 00 reaches a time instant $T_{00}$, this memory-type station device having station address value 00 embeds the data contained in memory addresses 0 to 3 into a packet and transmits the packet over the communication line 33.

Each of the three memory-type station devices 31 having station address values 01 to 03 which have received the packet transmitted by the memory-type station device having station address value 00 writes the received data into memory addresses 0 to 3 of the memory of the own station.

In addition, each of the three memory-type station devices 31 having station address values 01 to 03 which have received the packet transmitted by the memory-type station device having station address value 00 compulsorily corrects the internal clock 39 of its own station if it is determined by the allowable time-error determination circuit 34 that the time instant as indicated by the internal clock and the time instant as determined based on the time obtained by adding the time required for transmitting the packet of the received station address value and the time required for its propagation together do not fall within an allowable error range.

Since each internal clock is thus corrected, the internal clocks 39 of all the stations now indicate time instants T.sub.01 which agree to each other within the allowable time-error range as shown in FIG. 6. The internal clocks of all the stations thus indicate the time instant T.sub.01, and the data contained in memory addresses 4 to 7 of the memory-type station device of the station address value 01 is embedded in a packet which is then transmitted over the communication line 33. When the internal clocks reach time instant T.sub.02, the data contained in memory addresses 8 to B of the memory-type station device of the station address value 02 is embedded in a packet which is then transmitted. When the internal clocks reach time instant T.sub.03, the data contained in memory addresses C to F of the memory-type station device of the station address value 03 is embedded in a packet which is then transmitted over the communication line 33.

The time instant indicated by each internal clock cyclically and constantly changes from time instant $T_{00}$ to time instant $T_{03}$. The time instant $T_{03}$ in this first embodiment is, in general, defined for each system as its specific upper-limit time instant $T_M$. At the next time instant $T_{00}$ after one cycle of the internal clock, the data in the respective memories 30 in all the memory-type station devices are the same.

Since an error in time of each internal clock is immediately corrected upon reception of each packet by the allowable time-error determination circuit 34 if the error exceeds the allowable error, such an error will not be accumulated even when the cyclic operation of the internal clock continues, with the result that the internal clocks of all the stations can indicate time instants which always agree to each other.

In the system according to this embodiment, even when the memory-type station device of station address 01 fails or is disconnected by an accident from the communication line, the internal clocks of the stations having station address values 00, 02 and 03 still continue to proceed and these stations do not stop transmitting packets. Thus, the sharing of memory data among the three remaining stations continues and no failure of the system as a whole may result.

As is clear from the block diagram of FIG. 3, the operation of the memory-type station device is effected not by the conventional communication control with a microprocessor based on a control program but by means only of hardware in the form of state machines, so that the transmission rate of packets can be increased up to the upper-limit transmission capacity which the communication line has as a transmission medium.

When the transmission rate is selected to be 10 MBPS, since the packet in the present embodiment shown in FIG. 4 is composed of seven bytes (8 bits×7=56 bits), the time required to transmit a packet is 5.6 micro seconds (0.1_s×56 bits=5.6_56 bits=5.6_s). When it is assumed that the required propagation time of the packet on the communication line 33 is 1_s, one cycle time of the internal clock 39 is 6.6_s×4=26.4_s which is sufficiently shorter as compared to the signal response time of 1_s normally required for the control of apparatuses such as a robot, so that the response time in terms of the data shared by all the stations can be treaded virtually as zero.

Each of the stations constituting this system can communicate data with any other station in the system within a time period which is substantially zero and, in addition, all the memories hold the same data contents, which means that the stations share a single memory.

Differently from the above-mentioned conventional electronic wired system, in the system for sharing memory data of a plurality of stations according to the present invention, there is no distinction between apparatuses such as the central unit and the station device and all the stations can communicate data to one another arbitrarily and freely. Therefore, even when any one of the stations fails during the operation of the system, the remaining stations do not stop their transmission of packets, so that the system can still continue to operate. Thus, there will not arise the problem of the conventional electronic wired system that when the central unit stops operation the entire system also stops operation.

Second embodiment

Figure 8:
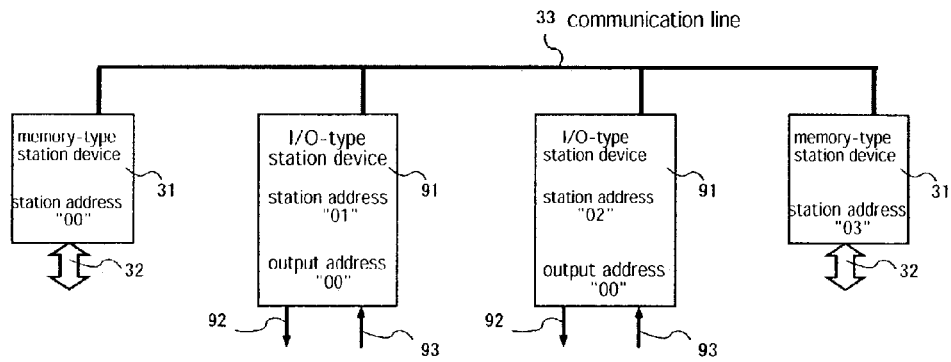
FIG. 8 is an illustration showing the structure of a memory sharing system according to a second embodiment of the invention.

A system for sharing memory data of a plurality of stations according to a second embodiment is a system which comprises two stations each composed of the memory-type station device 31 and two stations each composed of an I/O-type station device 91 (see FIG. 8).

Figure 9:
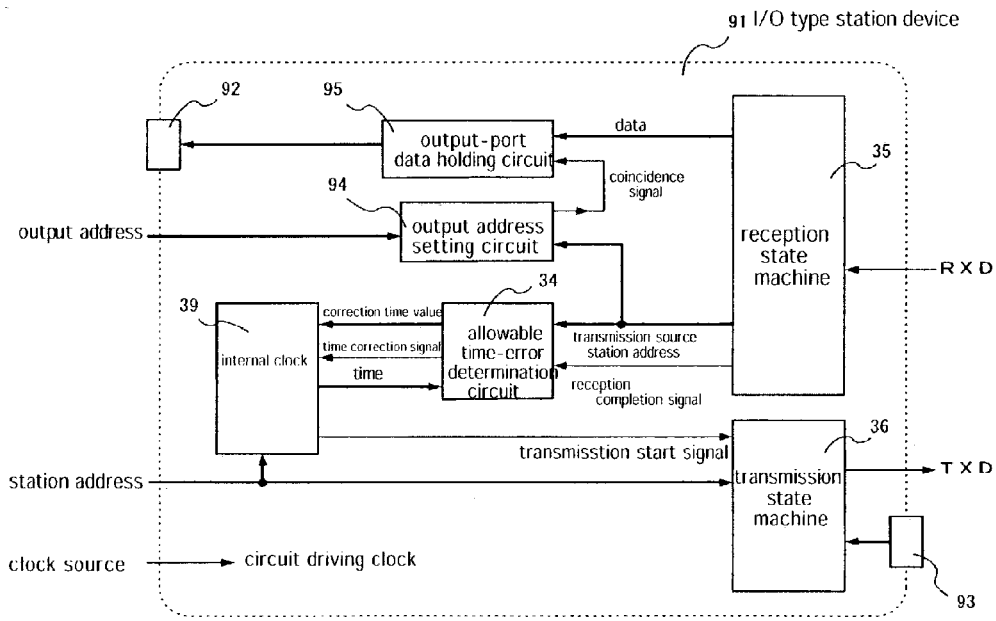
FIG. 9 is an illustration showing the structure of an I/O-type station device used in a station of the system according the second embodiment.

Each I/O-type station device 91 is formed by a semiconductor integrated circuit and comprises, as shown in FIG. 9, an I/O terminal output port 92, an I/O terminal input port 93, an output address setting circuit 94, an output-port data holding circuit 95, a transmission state machine 36, a reception state machine 35, an internal clock 39 and an allowable time-error determination circuit 34, all of which are constituted by digital circuits each driven by a circuit-driving clock from a clock source.

Unlike the memory-type station device 31, this I/O-type station device 91 does not comprise the memory 38 and the arbitration circuit 37. The reception state machine 35, the internal clock 39 and the allowable time-error determination circuit 34 are the same in operation as those of the first embodiment.

In order to input "on/off states" of elements such as switches and sensors for the control of an apparatus to a computer system as control signal inputs in the form of digital information, the I/O-type station device 91 is provided with the I/O terminal input port 93. There is also provided the I/O terminal output port 92 for supplying from the computer system control signal outputs for the control of the apparatus.

The I/O-type station device 91 of this embodiment comprises 32-bit I/O terminal input port 93 corresponding to 4-byte data and 32-bit I/O terminal output port 92 also corresponding to 4-byte data. In the system according to this second embodiment, the memory-type station devices 31 are given specific station address values 00 and 03, respectively, while the I/O-type station devices 91 are given specific station address values 01 and 02, respectively.

In the system according to the present embodiment, the state of the I/O terminal input port 93 of the I/O-type station device 91 having station address value 01 is written into memory addresses 4 to 7 of the memory 38 of each of the two memory-type station devices 31. Any one of the stations constituting this system can read the data written in the memory addresses 4 to 7 through the user interface 32 of the relevant memory-type station device 31. In a similar manner, the state of the I/O terminal input port 93 of the I/O-type station device 91 having station address value 02 is written into memory addresses 8 to B of the memory 38 of each of the two memory-type station devices 31, and any one of the stations constituting this system can read the data written in the memory addresses 8 to B through the user interface 32 of the relevant memory-type station device 31.

The principle of operation of the system according to this second embodiment will now be described.

When the internal clock 39 of the I/O-type station device 91 indicates a time instant which corresponds to the station address value of the own station, a transmission start signal is sent to the transmission state machine 36, whereupon the transmission state machine 36 reads data from the I/O terminal input port 93, embeds the data in a packet and transmits the packet.

The objective data to be supplied to the I/O terminal output port 92 is determined by a preset value from the exterior of the station.

When the reception state machine 35 receives a packet from another station, the relevant data in the received packet is held by the output-port data holding circuit 95 in response to a coincidence signal supplied to the circuit 95 if the preset value to the output address setting circuit 94 coincides to the station address value of the transmission source. Then, the data held by the output-port data holding circuit 95 is supplied to the I/O terminal output port 92.

In the case where the preset value to the output address setting circuit 94 of the I/O-type station device 91 having station address value 01 is "00", when a packet transmitted through the communication line 33 from the memory-type station device 31 at time instant $T_{00}$ of the internal clock 39 is received, the I/O-type station device 91 having station address value 01 can supply the content of the memory corresponding to the station address value 00 to the I/O terminal output port 92.

More specifically, by selecting an output address value to be set to the output address setting circuit 94, that the data of the shared memory 38 in the packet which corresponds to a station address value other than that of the own station can be obtained at the I/O terminal output port 92. The same is true of the I/O-type station device 91 having station address value 02.

In the case of the system according to this second embodiment, since the memory-type station device 31 and the I/O-type station device 91 coexist, by assigning the I/O terminal input port 93 of the I/O-type station device 91 to a control signal input for an apparatus to be used as a control object and by assigning the I/O terminal output port 92 to its control signal output, these 32-bit control signal input and output each corresponding to four-byte data can be treated as the data of the shared memory of the entire system contained in the memory within the memory-type station device 31.

Third Embodiment

A system for sharing memory data of a plurality of stations according to a third embodiment is a system in which the number of packets which each station can transmit in succession can be set. According to this system, when the internal clock indicates the time instant which corresponds to the station address value of the own station, packets equal in number to a number set to a packet transmission number determination circuit are transmitted in succession.

Figure 10:
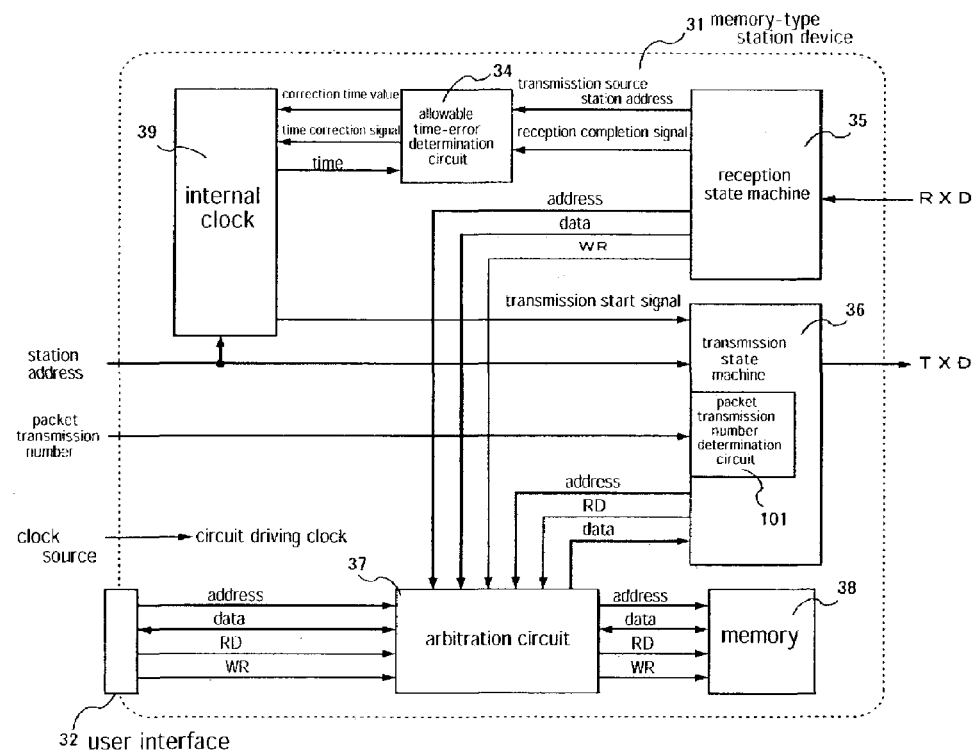
FIG. 10 is an illustration showing the structure of a memory-type station device used in the system according to a third embodiment of the invention.

A memory-type station device 31 used in this system is formed by a semiconductor integrated circuit, and its structure is as shown in FIG. 10. As compared to the device of the first embodiment shown in FIG. 3, the transmission state machine 36 is added with a packet transmission number determination circuit 101.

When the internal clock 39 indicates a time instant which corresponds to the station address value of the own station, the transmission state machine 36 transmits, in succession, packets equal in number to the number set to the packet transmission number determination circuit 101. The operation of the memory-type station devices 31 in other respects is the same as that of the first embodiment.

The number of packets transmitted is determined by a preset value from the exterior of the station. When this preset value is "0" or "1", the number of packets to be sent is defined as one. When the preset value to the packet transmission number determination circuit 101 of this embodiment is "0" or "1", only one packet is transmitted, so that the operations of such stations are all the same as that of the memory-type station device of the first embodiment.

The format of packet used in this embodiment is the same as that of the first embodiment shown in FIG. 4. Also, the relation between the station address values and the memory address locations is the same as that in the first embodiment.

Figure 12:
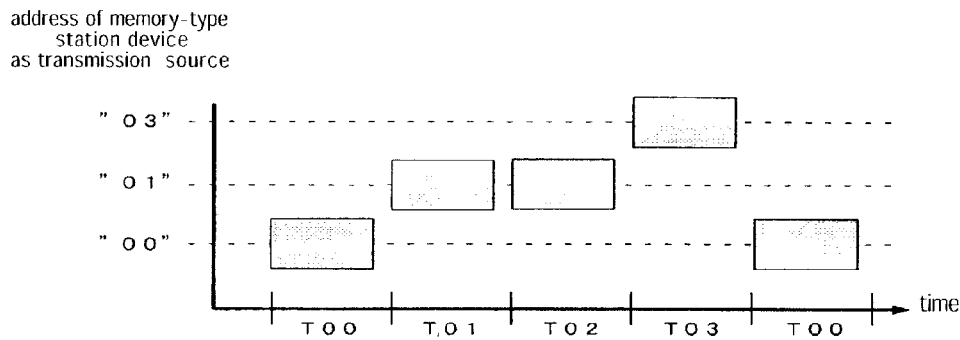
FIG. 12 is an illustration explaining the operation of the memory sharing system according to the third embodiment.

The operation of this embodiment will now be described for an exemplary system having three memory-type station devices 31 shown in 11 with reference to a timing chart of FIG. 12. The memory-type station devices 31 are given specific station addresses 00, 01 and 03, respectively.

When the internal clock 39 reaches a time instant $T_{00}$, a packet is transmitted from the memory-type station device 31 of the station address value 00. The data sent in this packet is the data in the memory addresses 0 to 3 of the memory 38 in the memory-type station device 31 of the station address value 01.

When the internal clock 39 reaches a time instant $T_{00}$, a packet is transmitted from the memory-type station device 31 of the station address value 01. The data contained in this packet is the data in the memory addresses 4 to 7 of the memory 38 in the memory-type station device 31 of station address value 01.

Figure 11:
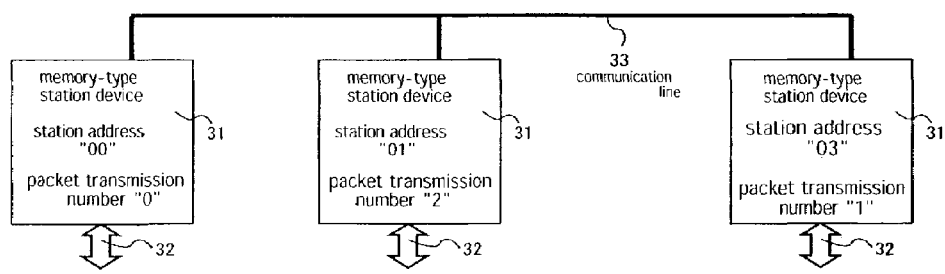
FIG. 11 is an illustration showing the structure of the memory sharing system according to the third embodiment.

As shown in FIG. 11, the preset value to the packet transmission number determination circuit of the memory-type station device 31 of station address value 01 is "2". Therefore, the memory-type station device 31 of the station address value 01 also transmits a packet when the internal clock 39 reaches the next time instant $T_{02}$ as shown in FIG. 12. The data contained in this packet is the data in memory addresses 8 to B of the memory 38 within the memory-type station device 31 of the station address value 01.

When the internal clock 39 reaches, a time instant $T_{03}$, a packet is transmitted from the memory-type station device 31 of the station address value 03. The data contained in this packet is the data in the memory addresses C to F of the memory 38 in the memory-type station device 31 of station address value 03.

In the system according to this embodiment, as is appreciated from the situation that a packet transmission is effected two times by the memory-type station device 31 of the station address value 01, a packet transmission is performed a plurality of times equal in number to the value set to the packet transmission number determination circuit, so that the amount of data to be written into the memories of other stations within one cycle of the internal clock can be increased by a factor equal to the value set to the packet transmission number determination circuit.

Fourth Embodiment

A system for sharing memory data of a plurality of stations according to a fourth embodiment comprises a station address occupation size determination circuit in each station. When the internal clock indicates a time instant corresponding to the station address value of the own station, a packet in which data of a variable length to be transmitted is embedded and to which information about the data length set to the station address occupation size determination circuit is added can be transmitted.

Figure 13:
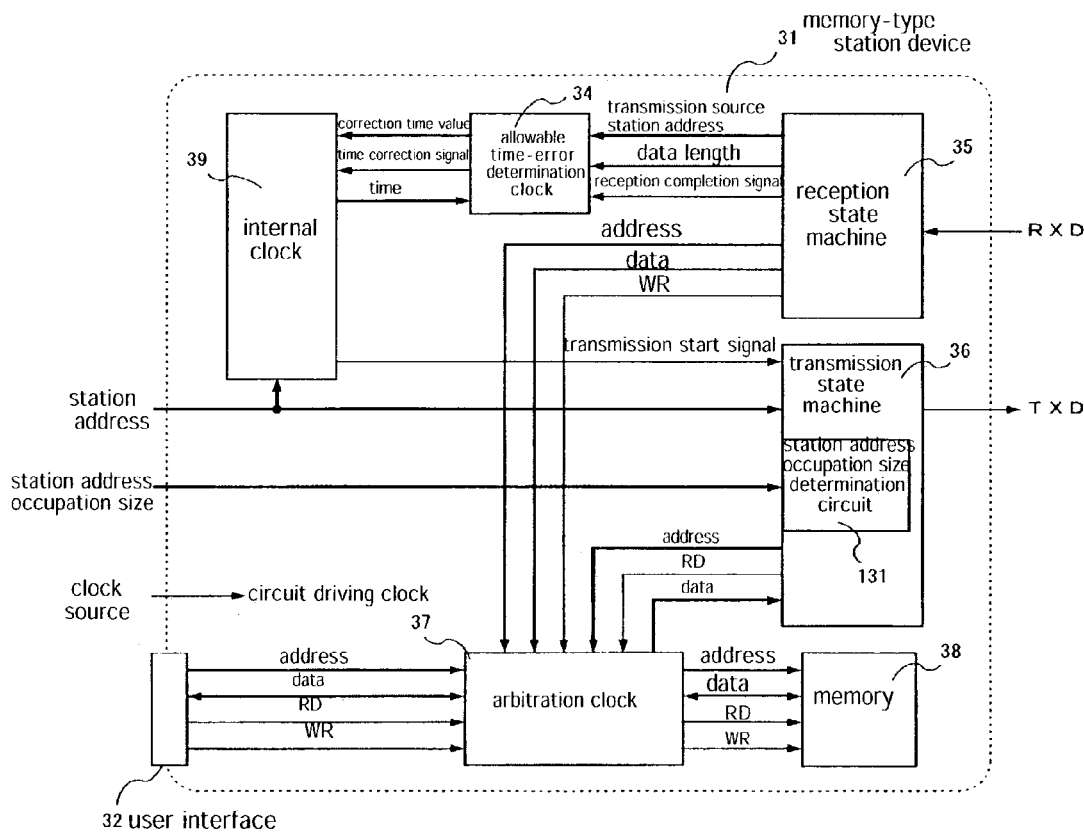
FIG. 13 is an illustration showing the structure of a memory-type station device used in the system according to a fourth embodiment of the invention.

A memory-type station device 31 used in this system is formed by a semiconductor integrated circuit, and its structure is show in FIG. 13. When comparing with the structure of the first embodiment shown in FIG. 3, the transmission state machine 36 is added with a station address occupation size determination circuit 131. For the calculation of correct time of the internal clock of the own station, a value representative of the data length as received by the reception state machine 35 is passed to the allowable time-error determination circuit 34.

When the internal clock 39 indicates a time instant which corresponds to the station address value of the own station, the transmission state machine 36 embeds in a packet data having a length determined by the value set to the station address occupation size determination circuit 131 and transmits the packet with information about the data length added thereto. The allowable time-error determination circuit 34 refers to the value, which is fed from the reception state machine 35 and representative of the data length of the received packet, for the calculation of correct time of the internal clock of the own station. The operation of this device in other respects is the same as that of the first embodiment.

The station address occupation size is determined by a preset value from the exterior of the station. When the preset value is "0" or "1", the data length for a packet transmission by the relevant station is deemed as being "one-fold". That is to day, the packet length is not increased, so that all the station devices operate in the same manner as the memory-type station device of the first embodiment. In the present embodiment, when the data length is "one-fold", the relationship between the memory addresses of the memory 38 and the station address values in this system is the same as that in the first embodiment.

The operation of this fourth embodiment will now be described for an exemplary system having three memory-type station devices 31 shown in FIG. 14 with reference to a timing chart of FIG. 15. The memory-type station devices 31 are given specific station address values 00, 01 and 03, respectively.

Figure 15:
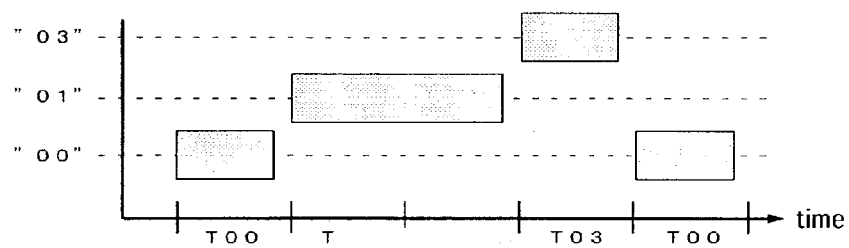
FIG. 15 is an illustration explaining the operation of the memory sharing system according to the fourth embodiment.
Figure 16:
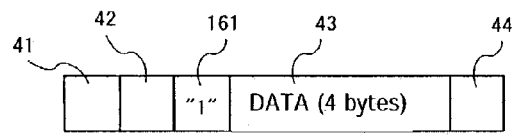
FIG. 16 is an illustration showing a packet used in the system according to the fourth embodiment.

As shown in the timing chart of FIG. 15, when the internal clock 39 reaches a time instant $T_{00}$, a packet in which four-byte data is embedded and to which information indicating the "one-fold" data length is added at a data-length designating portion 161 of the format shown in FIG. 16 is transmitted from the memory-type station device 31 of the station address value 00. The data contained in this packet is the four-byte data from the memory addresses 0 to 3 of the memory 38 within the memory-type station device 31 of the station address value 00.

Figure 14:
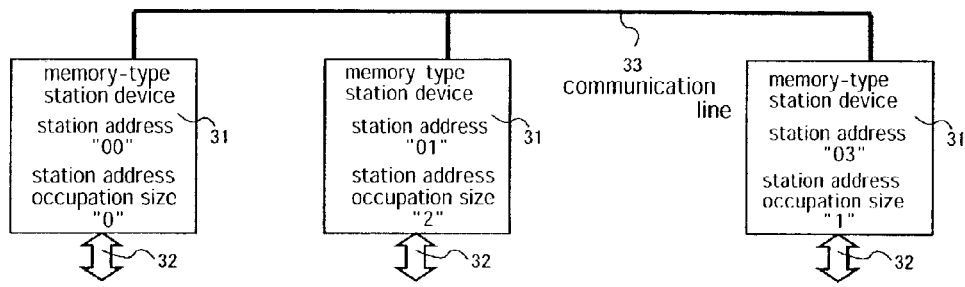
FIG. 14 is an illustration showing the structure of the memory sharing system according to the fourth embodiment.
Figure 17:
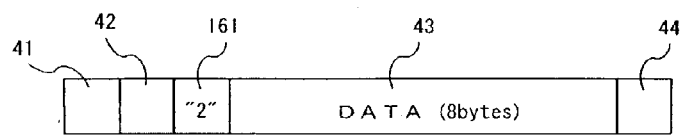
FIG. 17 is an illustration showing another packet used in the system according to the fourth embodiment.

As shown in FIG. 14, the value set to the station address occupation size determination circuit 131 of the memory-type station device 31 of the station address value 01 is "2". When the internal clock 39 reaches a time instant $T_{01}$, the memory-type station device 31 of the station address value 01 embeds, in a packet, eight-byte data from the memory addresses 4 to B of the memory 38 in the memory-type station device 31 of the station address value 01 and transmits the packet in the format shown in FIG. 17 to which "2" has been added at the data-length designating portion 161.

When the internal clock 39 reaches a time instant $T_{03}$, a packet in the format shown in FIG. 16 is transmitted from the memory-type station device 31 of the station address value 03. The data in this packet is four-byte data from the memory addresses C to F of the memory 38 in the memory-type station device 31 of the station address value 03, and "1" is added to the packet as its data length.

In the system according to this embodiment, as will be appreciated from the transmission of the packet embedded with the data of two-fold length performed by the memory-type station device 31 of the station address value 01, an amount of data increased by a factor set to the station address occupation size determination circuit is embedded in a single packet and transmitted, so that it becomes possible to write into the memories of the other stations at once within one cycle of the internal clock data of a size increased by the factor set to the station address occupation size determination circuit.

Fifth Embodiment

A system for sharing memory data of a plurality of stations according to a fifth embodiment comprises a reception condition managing register in each memory-type station device. By means of this register, it becomes possible to monitor the state of sharing data in the system and the state of connection of each station to the communication line.

The structure of this system is the same as that of the first embodiment shown in FIG. 2.

Figure 18:
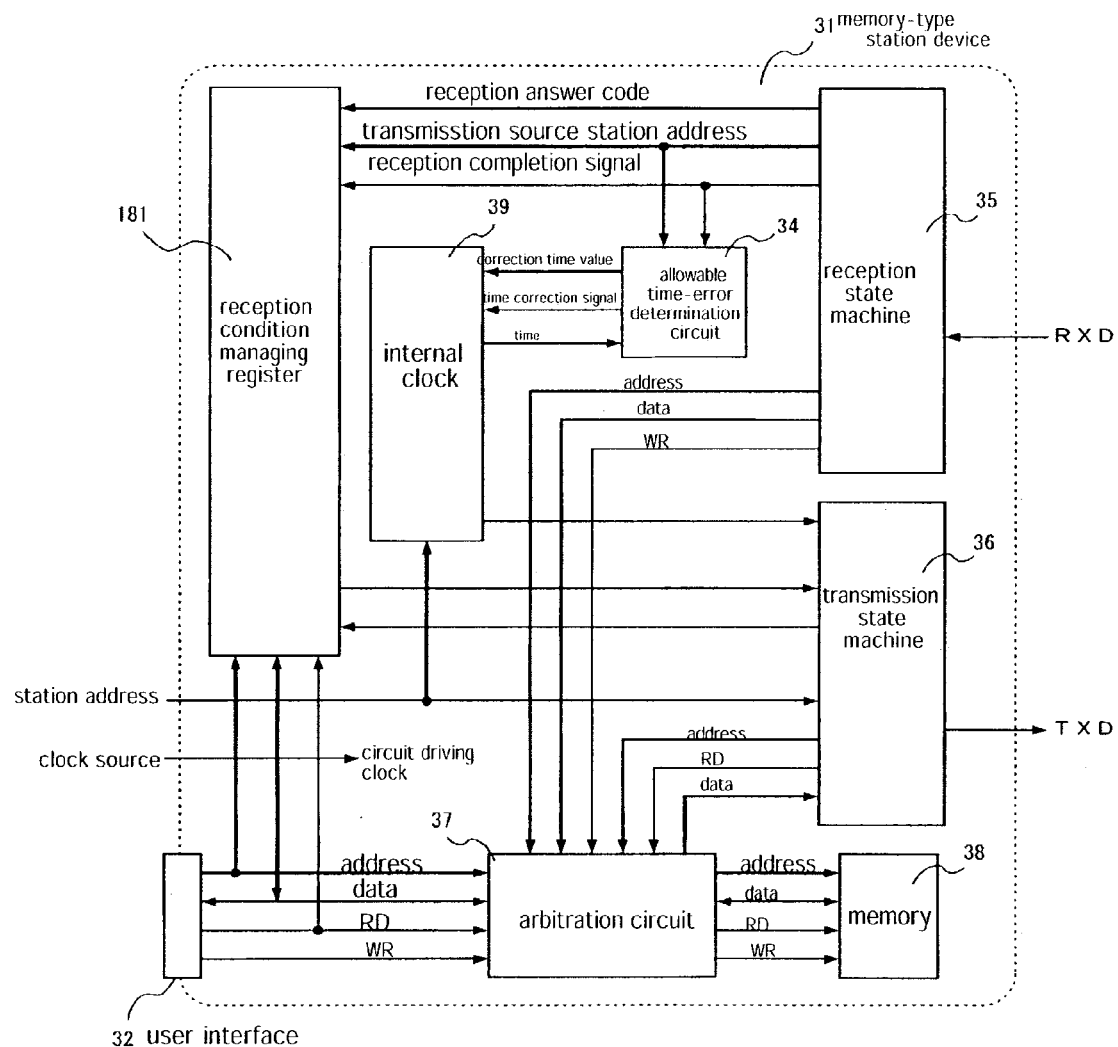
FIG. 18 is an illustration showing the structure of a memory-type station device used in the system according to a fifth embodiment of the invention.
Figure 19:
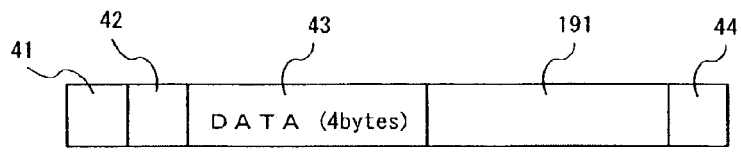
FIG. 19 is an illustration showing a packet used in the system according to the fifth embodiment.

A memory-type station device 31 used in this system is formed by a semiconductor integrated circuit, and its structure is show in FIG. 18. This device comprises, in addition to the elements of the first embodiment shown in FIG. 3, a reception condition managing register 181. This reception condition managing register 181 comprises two types of flag registers, i.e., type-A—A flag register and type-A–B flag register each composed of four bits. A received reception answer code, a transmission source station address value and a reception completion signal are passed from the reception state machine 35 to the reception condition managing register 181. A transmission answer code is passed from the reception condition managing register 181 to the transmission state machine 36. A transmission completion signal is passed from the transmission state machine 36 to the reception condition managing register 181. The user interface 32 is connected also to the reception condition managing register 181. Each packet which is handled by the transmission state machine 36 and the reception state machine 35 is added with an answer code 191 shown in FIG. 19. The operation of this embodiment in other respects is the same as that of the first embodiment.

The principle of operation of the system according to this fifth embodiment will now be described.

When the internal clock 39 indicates a time instant corresponding to the station address value of the own station, the type-A flag status information in the reception condition managing register 181 is added as the answer code to a packet to be transmitted from the transmission state machine 36, and the packet is then transmitted.

When the transmission of the packet is completed, all the type-A and type-B flag information in the reception condition managing register 181 is reset to "0" by the transmission completion signal passed from the transmission state machine 36 to the reception condition managing register 181.

When the reception state machine 35 receives a packet, a bit of the type-A flag information of the reception condition managing register 181 at that position which corresponds to the station address value of the transmission source is set to "1" by the reception answer code, the transmission source station address value and the reception completion signal which are passed from the reception state machine 35 to the reception condition managing register 181.

In this case, if that bit of the reception answer code which corresponds to the station address value of the own station is "1", a bit of the type-B flag information in the reception condition managing register 181 at that position which corresponds to the station address value of the transmission source is also set to "1".

By the above-described setting operation to the reception condition managing register 181, the type-A flag register indicates "those other stations from which packets were successfully received". The type-B flag register indicates, based on the type-A flag status information held in the other stations and sent from those station, "those other stations for which it has been acknowledged that the packet of the own station successfully reached and from which their packets were also successfully received", that is to say, "those other stations for each of which handshaking has been established" from the viewpoint of communication technique.

The user interface 32 enables the user not only to access the memory 38 through the arbitration circuit 37 but also to access the reception condition managing register 181 to read the type-A and the type-B flag information.

The change in state of the type-A and type-B flags in the reception condition managing registers 181 of the four memory-type station devices 31 according to the present embodiment will now be described with reference to FIGS. 20, 21 and 22, in each of which the vertical axis represents the time indicated by the internal clock.

For the purpose of easy understanding, the following description of the operation will be made concentrating only on the reception condition managing register 181 in the memory-type station device 131 of the station address value 01.

Figure 20:
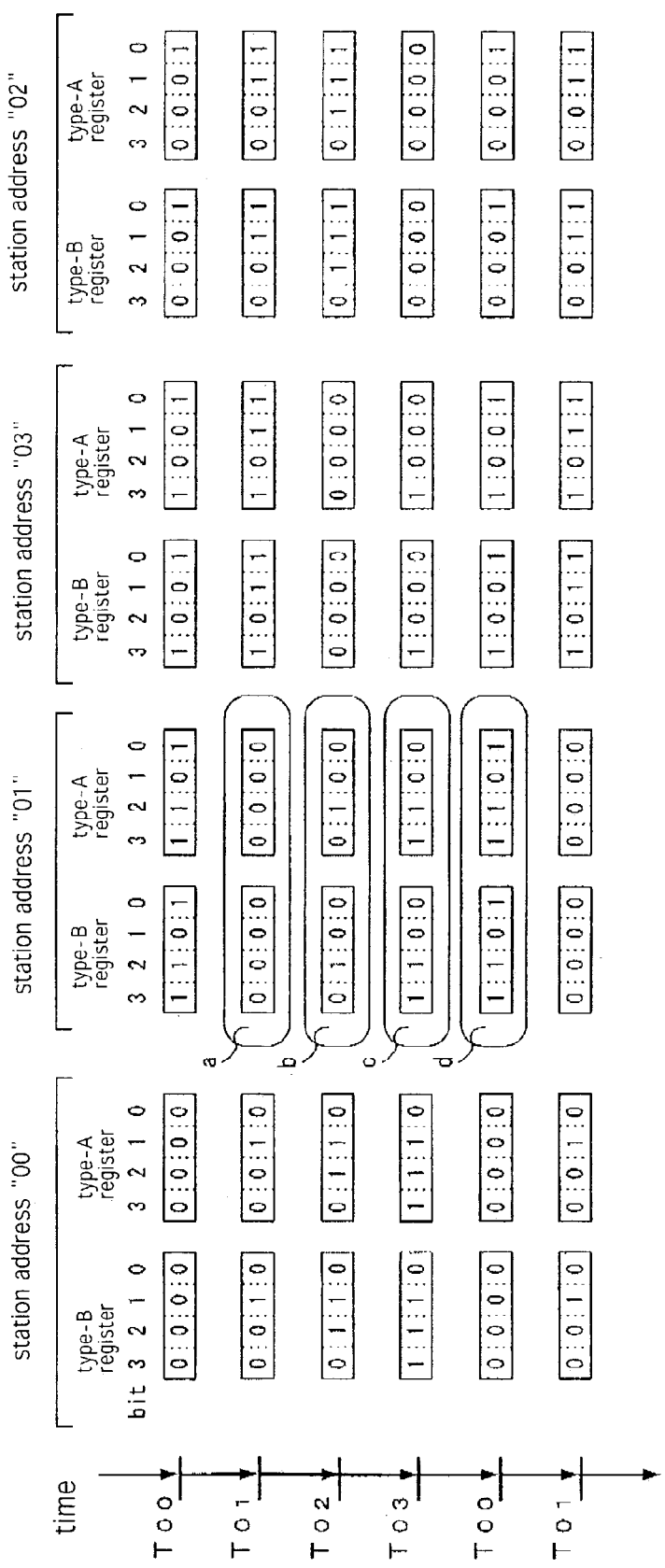
FIGS. 20 to 22 are illustrations explaining the operation of the memory sharing system according to the fifth embodiment.
Figure 21:
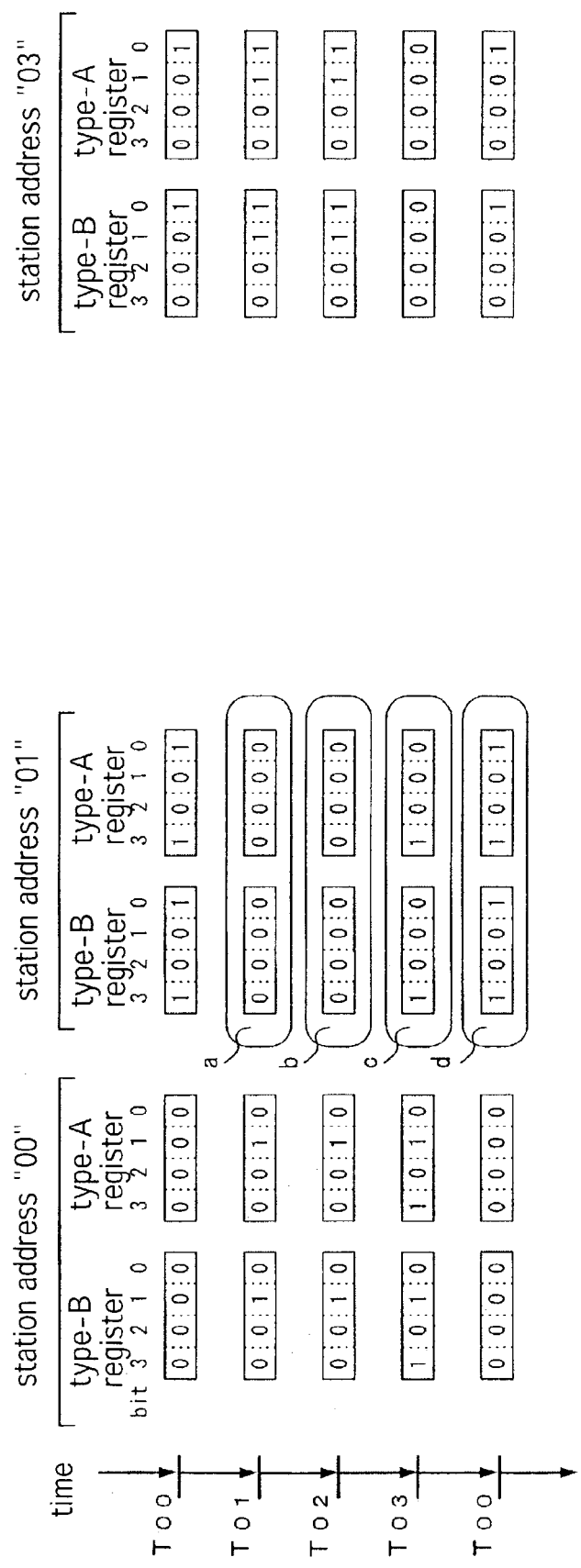

When the memory-type station device 31 of the station address value 01 completes transmission of a packet, the type-A and the type-B flag information once indicates all "0" (see FIG. 20 at a).

When the memory-type station device 31 of the station address value 02 completed transmission of a packet, the bit #2 of each of the type-A information and the type-B information in the reception condition managing register 181 of the station device of the station address value 01 which has just received the packet is set (see FIG. 20 at b).

When the memory-type station device 31 of the station address value 03 completed transmission of a packet, the bit #3 of each of the type-A information and the type-B information in the reception condition managing register 181 of the station device of the station address value 01 which has just received the packet is set (see FIG. 20 at c).

When the memory-type station device 31 of the station address value 00 completed transmission of a packet, the bit #0 of each of the type-A information and the type-B information in the reception condition managing register 181 of the station device of the station address value 01 which has just received the packet is set (see FIG. 20 at d).

For the station of the station address value 01, the type-A flag information in the reception condition managing register 181 at the time when the internal clock reaches the time instant corresponding to the station address value of the own station indicates "those other stations from which packets were successfully received" in the previous one cycle, while the type-B flag register indicates "those stations for each of which handshaking has been established" in the previous one cycle.

Next, the change in state of the reception condition managing register 181 of the station of the station address value 01 will be described with reference to FIG. 21 for the case where the station of the station address value 02 fails to effect a packet transmission due to some trouble or interference. In this case, bits #2 of both the type-A and type-B flag registers are not set as shown in FIG. 21 at b, c and d. Based on this, the user can recognize at the station of the station address value 01 that the station of the station address value 02 does not respond.

The user can further recognize that the data at the memory address location corresponding to the station address value 02 is not in the shared condition for the station of the station address value 01.

Next, the change in state of the flags will be described with reference to FIG. 22 for the case where a packet transmitted from the station of the station address value 01 when its internal clock 39 indicates a time instant $T_{01}$, was not received by the other stations due to an instantaneous accidental interference caused by impulse noise or the like from the outside onto the communication line 33.

Figure 22:
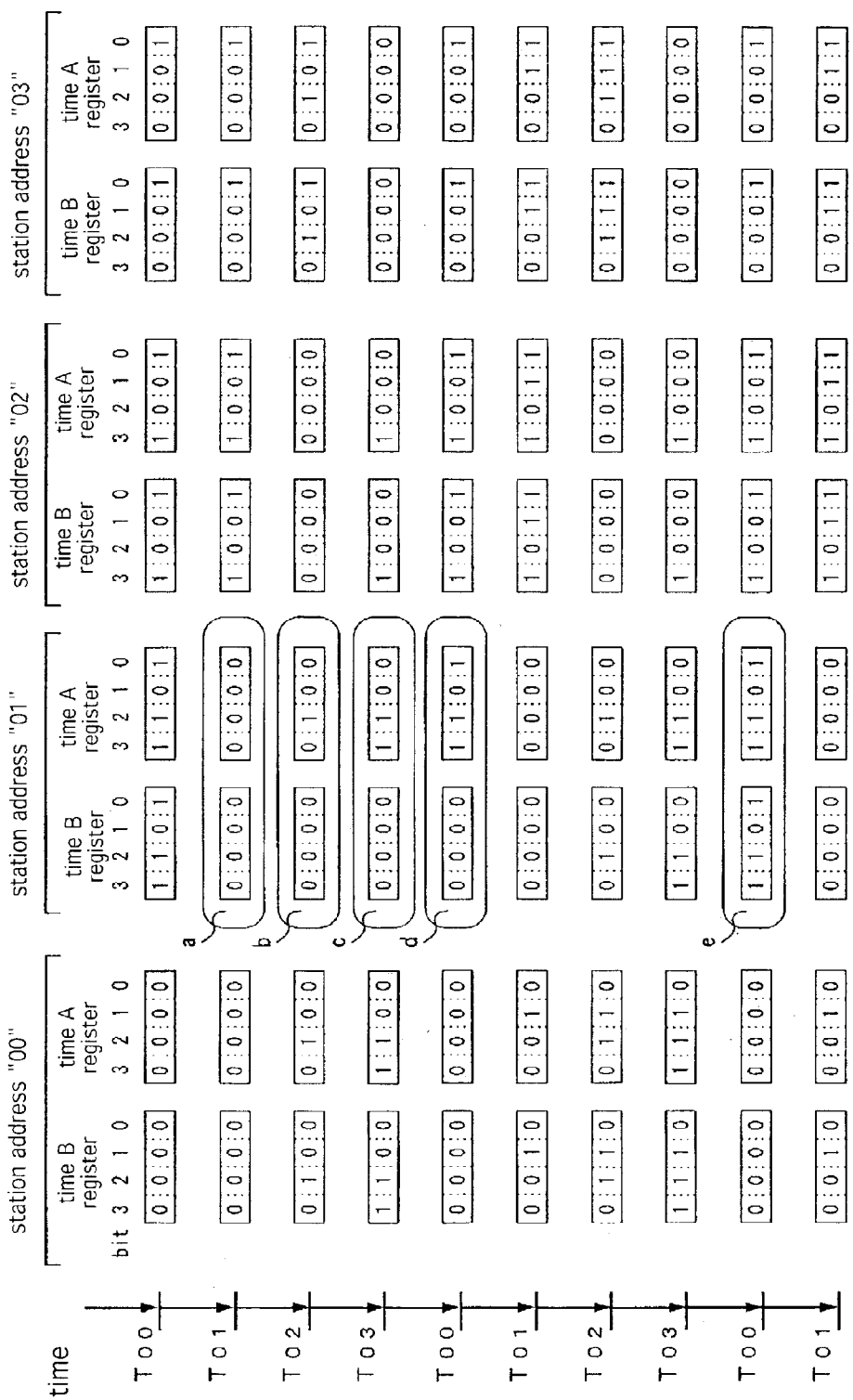

FIG. 22 shows at d that the type-A flag information indicates that reception from the other stations has been performed successfully but that the type-B flag information indicates that delivery of data to the other stations has failed. FIG. 22 also shows at e that the above abnormal condition was caused by an instantaneous accidental interference whereafter the normal condition resumed.

Although the operation of the reception condition monitoring register 181 has been described in the above for the station having the station address value 01, since the operation of the reception condition monitoring register 181 is identical in all the memory-type station devices, every station can determine the establishment of handshaking with all of the other stations.

In the system according to the present embodiment, it is possible to determine the quality in operation of the system in terms of whether the other stations are connected to the communication line and whether the transmission of packet has been hampered. It is also possible to determine whether the shared data is the newest one updated within the directly preceding cycle of the internal clock.

In the first to fifth embodiments, although the memory-type station device and/or the I/O-type station device are each formed by a semiconductor integrated circuit, it will be apparent for those skilled in the art that such station device can be constituted by separate elements.

The invention claimed is:

1. A system for sharing memory data of a plurality of stations in which packets are transferred between the plurality of stations connected to a communication line (33) characterized:

in that each station is a memory-type station device (31) which comprises a memory (38), a user interface (32) for enabling said memory to be accessed from the exterior of said station, a transmission state machine (36) for transmitting a packet, a reception state machine (35) for receiving a packet, a cyclic internal clock (39) for tracking specific time instants assigned to each station and for tracking time instants when a packet is transmitted from a station to said communication line, an allowable time-error determination circuit (34) and an arbitration circuit (37) for arbitrating accesses from said transmission and reception state machines (36, 35) and from said user interface (32);

in that specific station address values 00, 01, ..., 0N are set to said stations, respectively;

in that a sum of a time required to transmit a packet onto said communication line (33) and a time required for said packet to propagate on said communication line (33) is selected to be a unit of time between time instants indicated by said internal clock (39);

in that each time instant ($T_{00}$, $T_{01}$, $T_{02}$, ..., $T_{0N}$) is assigned to a respective one of said station address values;

in that said internal clocks (39) in said stations of said system all indicate the same time, instant and each advances from the time instant $T_{00}$ to a maximum time instant $T_M$ cyclically;

in that, when said internal clock (39) indicates a time instant which corresponds to the station address value of a given station, data in that memory address location of said memory which corresponds to the station address value of said given station is read through said arbitration circuit (37) and embedded in a packet which is then transmitted over said communication line (33);

in that, when a packet is received successfully, its transmission source is determined from the received packet, whereupon said data in the received packet is written through said arbitration circuit (37) into that memory address location which corresponds to the station address value of said transmission source; and in that said allowable time-error determination circuit (34) corrects the time instant of said internal clock based on the difference between:
a) a correct time instant of said internal clock;
b) a time instant which is the sum of
   a time instant of the station specified by the station address included in the packet actually transmitted by the other station, and
   time required for said transmission.

2. A system for sharing memory data of a plurality of station according to claim 1, wherein a length of the data in the packet is fixed, said memory-type station device comprising a packet transmission number determination circuit (101) which causes packets equal in number to a number set to said packet transmission number determination circuit to be transmitted in succession from a time instant corresponding to the station address value of the own station to thereby allow the memory-type station device to occupy a memory address range which corresponds to a plurality of stations.

3. A system for sharing memory data of a plurality of station according to claim 1, wherein a length of the data in the packet is variable while information of the data length is added to said packet, said memory-type station device comprising a station address occupation size determination circuit (131) which causes a packet having a data length set to said station address occupation size determination circuit to be transmitted from a time instant corresponding to the station address value of the own station to thereby allow the memory-type station device to occupy a memory address range which corresponds to a plurality of stations.

4. A system for sharing memory data of a plurality of station according to claim 1, wherein reception completion information from other stations is added to the packet, and wherein said memory-type station device is further provided with a reception condition managing register (181) which manages a handshaking condition or a condition of said communication line (33) in each cycle of said internal clock based on said reception completion information.

5. A semiconductor integrated circuit which constitutes said memory-type station device in a system for sharing memory data of a plurality of station according to claim 1.

6. An electronic circuit for implementing said memory-type station device in a system for sharing memory data of a plurality of station according to claim 1.

7. A system for sharing memory data of a plurality of station according to claim 1, wherein an I/O-type station device (91) comprising an I/O terminal output port (92), an I/O terminal input port (93), an output address setting circuit (94), an output-port data holding circuit (95), a transmission state machine (36) for transmitting a packet, a reception state machine (35) for receiving a packet, an internal clock (39) and an allowable time-error determination circuit (34) is additionally connected to said communication line (33), wherein, when said internal clock (39) indicates a time instant which corresponds to the &tation address value of a given station composed of the I/O-type station device (91), data is read from the I/O terminal input port (93) of said given station and embedded into a packet which is then transmitted over said communication line (38), and wherein, when a packet is received successfully and when a preset value to said output address setting circuit (94) and the station address value of a transmission source of the received packet agree to each other, the relevant data in the receive packet is held in said output-port data holding circuit (95) and supplied to said I/O terminal output port (92).

* * * * *